United States Patent
Bilik et al.

(10) Patent No.: US 10,114,115 B2
(45) Date of Patent: Oct. 30, 2018

(54) DYNAMIC SENSOR ARRAY

(71) Applicant: GM GLOBAL TECHNOLOGY OPERATIONS LLC, Detroit, MI (US)

(72) Inventors: Igal Bilik, Rehovot (IL); Avshalom Suissa, Kiryat Ono (IL); Inna Stainvas Olshansky, Modin (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 402 days.

(21) Appl. No.: 14/907,505

(22) PCT Filed: Jul. 25, 2013

(86) PCT No.: PCT/US2013/052110
§ 371 (c)(1),
(2) Date: Jan. 25, 2016

(87) PCT Pub. No.: WO2015/012849
PCT Pub. Date: Jan. 29, 2015

(65) Prior Publication Data
US 2016/0195611 A1 Jul. 7, 2016

(51) Int. Cl.
*G01S 7/03* (2006.01)
*H01Q 1/32* (2006.01)
*G01S 13/02* (2006.01)
*G01S 13/93* (2006.01)
*H01Q 21/00* (2006.01)

(52) U.S. Cl.
CPC ............ *G01S 13/0209* (2013.01); *G01S 7/03* (2013.01); *H01Q 1/3233* (2013.01); *H01Q 21/00* (2013.01); *G01S 13/931* (2013.01)

(58) Field of Classification Search
CPC ...... G01S 13/0209; G01S 7/03; G01S 13/931; H01Q 1/3233; H01Q 21/00
USPC .......................................................... 342/70
See application file for complete search history.

(56) References Cited

U.S. PATENT DOCUMENTS

| 6,447,478 | B1 | 9/2002 | Maynard | |
|---|---|---|---|---|
| 2003/0171758 | A1* | 9/2003 | Gibson | A61B 17/3468 606/129 |
| 2008/0309567 | A1* | 12/2008 | Sabet | H01Q 1/2241 343/745 |

(Continued)

FOREIGN PATENT DOCUMENTS

| CN | 1346732 A | 5/2002 |
|---|---|---|
| CN | 1593862 A | 3/2005 |

(Continued)

OTHER PUBLICATIONS

International Search Report and Written Opinion for Patent Cooperation Treaty Patent Application No. PCT/US13/52110, filed Jul. 25, 2013.

(Continued)

*Primary Examiner* — Frank J McGue
(74) *Attorney, Agent, or Firm* — Lorenz & Kopf LLP

(57) ABSTRACT

Methods and apparatus are provided for controlling a beam pattern of a sensor array. The apparatus includes a plurality of sensors, wherein a distance is defined between at least two of the sensors. A shape memory alloy ("SMA") is coupled to at least one of the sensors. The SMA is controllably deformable to vary the distance between the sensors.

16 Claims, 4 Drawing Sheets

(56) References Cited

U.S. PATENT DOCUMENTS

| | | | |
|---|---|---|---|
| 2010/0036208 A1* | 2/2010 | Koh | A61B 5/0031 600/300 |
| 2011/0034912 A1* | 2/2011 | de Graff | A61B 1/05 606/21 |
| 2012/0116382 A1* | 5/2012 | Ku | A61B 18/1492 606/33 |

FOREIGN PATENT DOCUMENTS

| | | | | |
|---|---|---|---|---|
| CN | 101581287 A | | 11/2009 | |
| KR | 870067 | * | 11/2008 | B25J 3/02 |
| WO | 99/60267 A1 | | 11/1999 | |
| WO | 2015012849 A1 | | 1/2015 | |

OTHER PUBLICATIONS

The International Bureau of WIPO, International Preliminary Report on Patentability for International Application No. PCT/US2013/052110 dated Feb. 4, 2016.

State Intellectual Property Office of the People's Republic of China, Office Action in Chinese Patent Application No. 201380078474.1 dated Feb. 24, 2017.

* cited by examiner

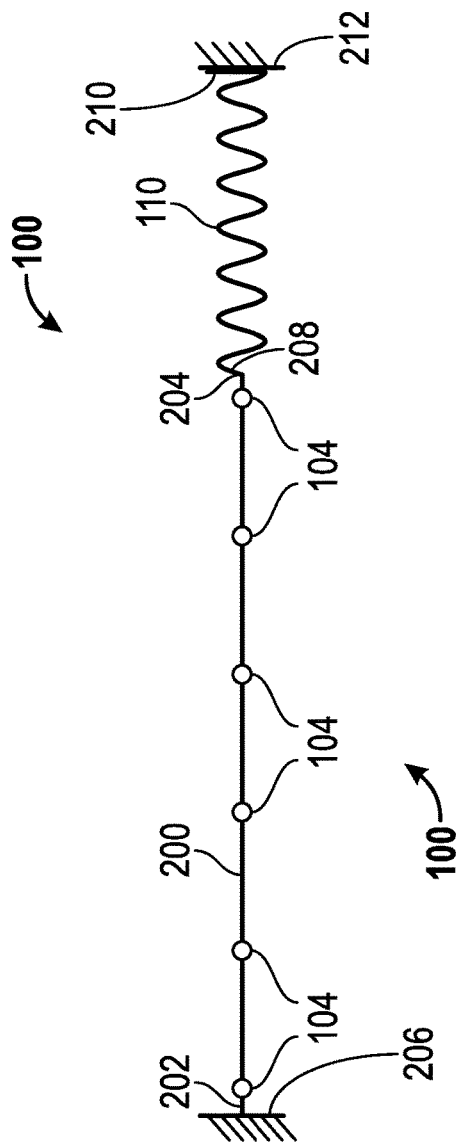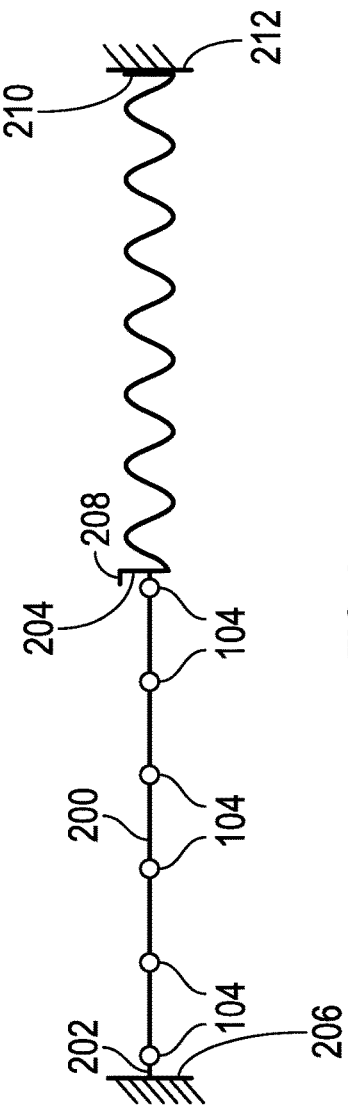
FIG. 2
FIG. 3

DYNAMIC SENSOR ARRAY

CROSS REFERENCE TO RELATED APPLICATION

This application is a U.S. National-Stage entry under 35 U.S.C. § 371 based on International Application No. PCT/US13/52110, filed Jul. 25, 2013 which was published under PCT Article 21(2) and is incorporated in its entirety herein.

TECHNICAL FIELD

This application pertains to sensor arrays and methods of operation.

BACKGROUND

Ultra-wideband ("UWB") radar provides high range resolution and is used in a variety of applications. These applications include automotive and other vehicular applications. For example, UWB radar may be utilized to sense other objects (e.g., other vehicles) near a vehicle to avoid collisions.

In the United States, Federal Communications Commission ("FCC") regulations provide a bandwidth of 4 GHz between 77 GHz and 81 GHz for automotive radar applications. In typical UWB radar sensor arrays, the sensors are fixed with respect to one another to receive a radio frequency ("RF") signal at a certain frequency (i.e., a certain wavelength). Performance of the array may be degraded when the distance between the sensors is mismatched from the half wavelength of the transmitted signal.

Accordingly, it is desirable to provide a sensing apparatus and method that can receive RF signals at multiple frequencies and wavelengths with less performance degradation than in prior art systems. Furthermore, other desirable features and characteristics of the present invention will become apparent from the subsequent detailed description and the appended claims, taken in conjunction with the accompanying drawings and the foregoing technical field and background.

SUMMARY

A sensing apparatus is provided. In one exemplary embodiment, the apparatus includes a sensor array. The sensor array includes a plurality of sensors with a distance defined between at least two of the plurality of sensors. The apparatus also includes a shape memory alloy ("SMA") operatively connected to at least one of the plurality of sensors. The SMA is controllably deformable to vary the distance between the at least two of the plurality of sensors.

A method is provided for controlling a beam pattern of a sensor array. In one exemplary embodiment, the method includes receiving a desired frequency of operation. The method also includes deforming an SMA operatively connected to a plurality of sensors such that a distance between at least two of the plurality of sensors corresponds to the desired frequency of operation.

DESCRIPTION OF THE DRAWINGS

The exemplary embodiments will hereinafter be described in conjunction with the following drawing figures, wherein like numerals denote like elements, and wherein:

FIG. 2 is the sensing apparatus in accordance with another exemplary embodiment with the SMA in a non-deformed shape;

FIG. 3 is the sensing apparatus of the exemplary embodiment shown in FIG. 2 with the SMA in a deformed shape;

DETAILED DESCRIPTION

Figure 1:
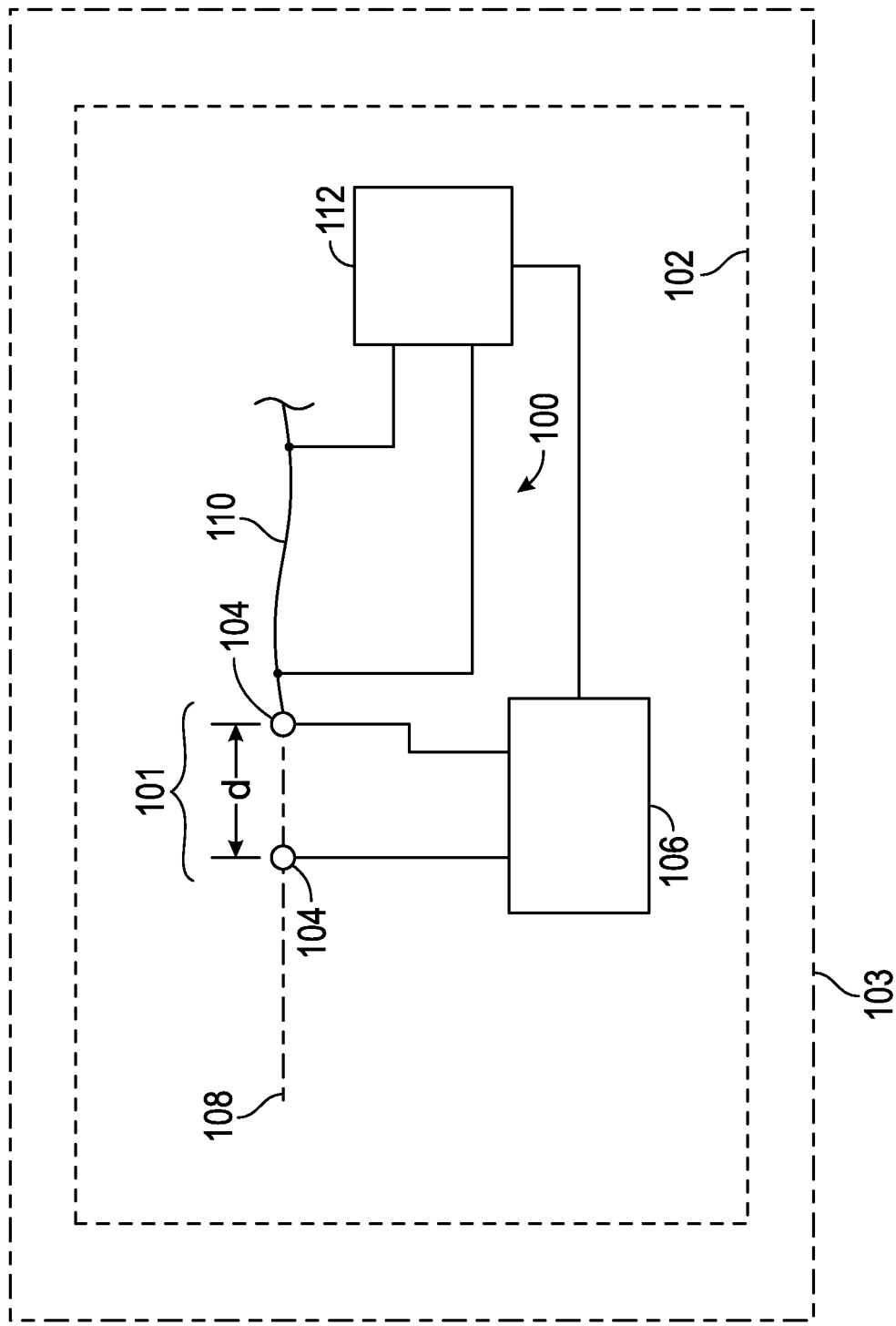
FIG. 1 is a sensing apparatus including a plurality of sensors operatively connected to a shape memory alloy ("SMA") in accordance with an exemplary embodiment.

The following detailed description is merely exemplary in nature and is not intended to limit the application and uses. Furthermore, there is no intention to be bound by any expressed or implied theory presented in the preceding technical field, background, brief summary or the following detailed description.

Referring to the figures, wherein like numerals indicate like parts throughout the several views, an apparatus 100 for implementing a sensor array 101 is shown and described herein. The sensor array 101 of the exemplary embodiments is utilized as part of a radar system 102 for a vehicle 103, such as, but not limited to, an automobile (not separately numbered). More specifically, the sensor array 101 of the exemplary embodiments is utilized as part of an ultra wideband ("UWB") radar system. As such, the sensor array 101 may also be referred to as a UWB sensor array 101. The sensor array 101 of the exemplary embodiments is utilized to receive radio frequency ("RF") signals. However, in other embodiments, the sensor array 101 may be utilized to receive other types of signals, e.g., sound.

The sensor array 101 includes a plurality of sensors 104. In the exemplary embodiments, each sensor positioned 104 comprises a conductive material, as is appreciated by those skilled in the art. The sensors 104 of the sensor array 101 are electrically connected to a receiver 106. As such, the RF signals received by the sensor array 101 are received by the receiver 106 for demodulation, decoding, etc., as appreciated by those skilled in the art.

In the exemplary embodiments, the sensors 104 are positioned linearly. That is, the sensors are positioned generally along a line 108. However, the sensors 104 may alternatively be positioned in other geometric shapes.

The sensor array 101 may include more than the two sensors 104 shown in FIG. 1. In some configurations, the sensor array 101 may include ten sensors 104, 16 sensors 104, or any number of sensors 104 as required by the sensor array 101 application.

A distance d is defined between each pair of adjacent sensors 104. Those skilled in the art appreciate that the distance defined between each pair of adjacent sensors 104 may be referred to as an aperture. In the exemplary embodiment, this distance is about half of the desired wavelength of the frequency of the RF signals being received by the sensor array 101. That is, $d=\lambda/2$, where d is the distance and $\lambda$ is the wavelength. Of course, the wavelength is equal to the speed of light divided by the frequency. That is, $\lambda=c/f$ where c is the speed of light and f is the frequency.

The apparatus 100 includes a shape memory alloy ("SMA") 110 operatively connected to at least one of the plurality of sensors 104. As appreciated by those skilled in the art, the SMA 110 is a material that may change shape, stiffness, position, natural frequency, or other mechanical characteristics in response to temperature or electromagnetic fields. Various materials may be utilized to produce the SMA 110, including, but not limited to, nickel-titanium, copper-aluminum-nickel, copper-zinc-aluminum, and iron-manganese-silicon alloys. The SMA 110 may alternatively be referred to as a smart metal, a memory metal, a memory alloy, or a smart alloy.

The SMA 110 of the apparatus 100 is controllably deformable to vary the distance between at least two of the sensors 104. In the exemplary embodiments, the SMA 110 is operatively connected to at least one of the sensors 104 such that, when heated, the SMA 110 changes shape to change the distance between that sensor 104 and another sensor 104. The heating of the SMA 110 may be accomplished by directing an electric current therethrough.

The apparatus 100 may also include a controller 112 to control deformation of the SMA 110. As shown in FIG. 1, the controller 112 is electrically connected to the SMA 110 to supply a current to run through the SMA 110. The controller 112 may control the amount of current running through the SMA 110 and, thus, the amount of deformation. In the embodiment shown in FIG. 1, the controller 112 is in communication with the receiver 106, such that data may be shared therebetween to assist in the controlled deformation of the SMA 110.

As stated above, FCC regulations provides a bandwidth of 4 GHz between 77 GHz and 81 GHz for automotive radar applications. Therefore, it is desirable for the sensors 104 of the exemplary embodiments to receive RF signals in frequencies between the minimum frequency of 77 GHz and the maximum frequency of 81 GHz. As the distance between adjacent sensors should be matched to a half wavelength, the distances corresponding to 77 GHz and 81 GHz are, respectively, about 1.95 mm and 1.85 mm. Therefore, the change in distance between adjacent sensors 104 is about 0.1 mm.

In the exemplary embodiment schematically illustrated in FIGS. 2 and 3, the apparatus 100 includes an elastic substrate 200. The elastic substrate 200 includes an elastic material to enable stretching of the substrate 200. The elastic substrate 200 may be implemented as an elastic pad, rubber band, or similar material.

The sensors 104 are positioned on the elastic substrate 200 such that when stretched, the distances between adjacent sensors 104 change, but remain generally equal to one another. Furthermore, the distances between the adjacent sensors 104 change generally simultaneously. The elastic substrate 200 includes a first end 202 and a second end 204 with the sensors 104 positioned between the ends 202, 204. The first end 202 of the elastic substrate 200 is operatively connected to a first anchor 206.

In this exemplary embodiment, the SMA 110 is shaped as a spring. That is, the SMA 110 is a coiled wire. A first end 208 of the SMA 110 is operatively connected to the second end 204 of the elastic substrate 200. A second end 210 of the SMA 110 is operatively connected to a second anchor 212. Thus, the SMA 110 and the elastic substrate 200 are disposed between the anchors 206, 212. The anchors 206, 212 are generally fixed with respect to one another. That is, the distance between the anchors 206, 212 is generally unchanging. The anchors 206, 212 may be part of a housing (not shown) supporting the apparatus 100, part of the vehicle 103, or any other suitable object.

In operation, the tension between the coil-shaped SMA 110 and the elastic substrate 200 is utilized. When an electric current is run through the SMA 110, the SMA 110 will contract, thus elongating the elastic substrate 200, as shown in FIG. 2. When the SMA 110 is in this "normal", i.e., non-deformed position, a maximum distance between each pair of adjacent sensors 104 is achieved. When the electric current is removed, the elastic substrate 200 pulls against the SMA 110 back to an elongated position, as shown in FIG. 3. When fully contracted, a minimum distance between each pair of adjacent sensors 104 is achieved. Thus, by selectively applying and removing current from the SMA 110 the distance between the sensors 104 will range between the maximum distance and the minimum distance. Furthermore, the SMA 110 is controllably deformable to change the distances between different adjacent pairs of sensors 104 simultaneously.

Figure 4:
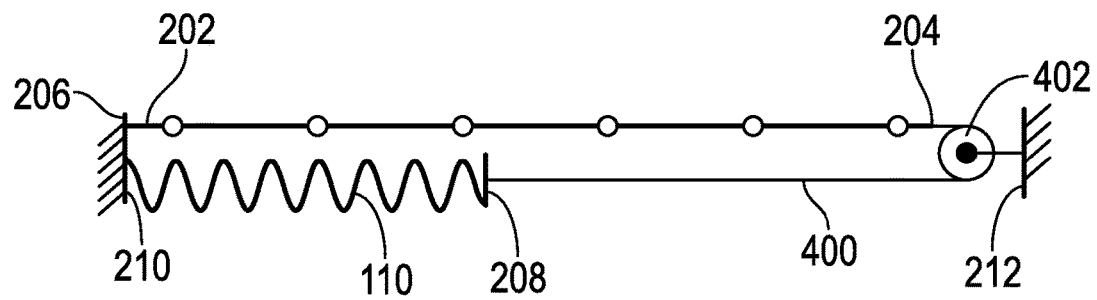
FIG. 4 is the sensing apparatus in accordance with yet another exemplary embodiment with the SMA in a non-deformed shape.
Figure 5:
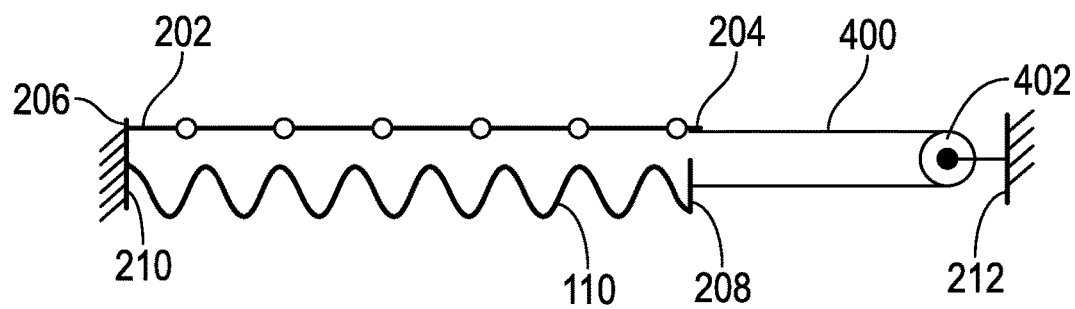
FIG. 5 is the sensing apparatus of the exemplary embodiment shown in FIG. 4 with the SMA in a deformed shape.

In another exemplary embodiment of the apparatus 100, as shown in FIGS. 4 and 5, the SMA 110 is again shaped as a spring. The first end 202 of the elastic substrate 200 and the second end 210 of the SMA 110 are connected to the first anchor 206. A tie 400 is operatively connected between the elastic substrate 200 and the SMA 110. Specifically, the tie 400 is connected to both the second end 204 of the elastic substrate 200 and the first end 208 of the SMA 110. A pulley 402, operatively connected to the second anchor 212, engages with the tie 400. By utilizing the tie 400 and pulley 402 in this manner, less expansion and contraction of the SMA 110 is required to move the sensors 104 between minimum and maximum distances.

Figure 6:
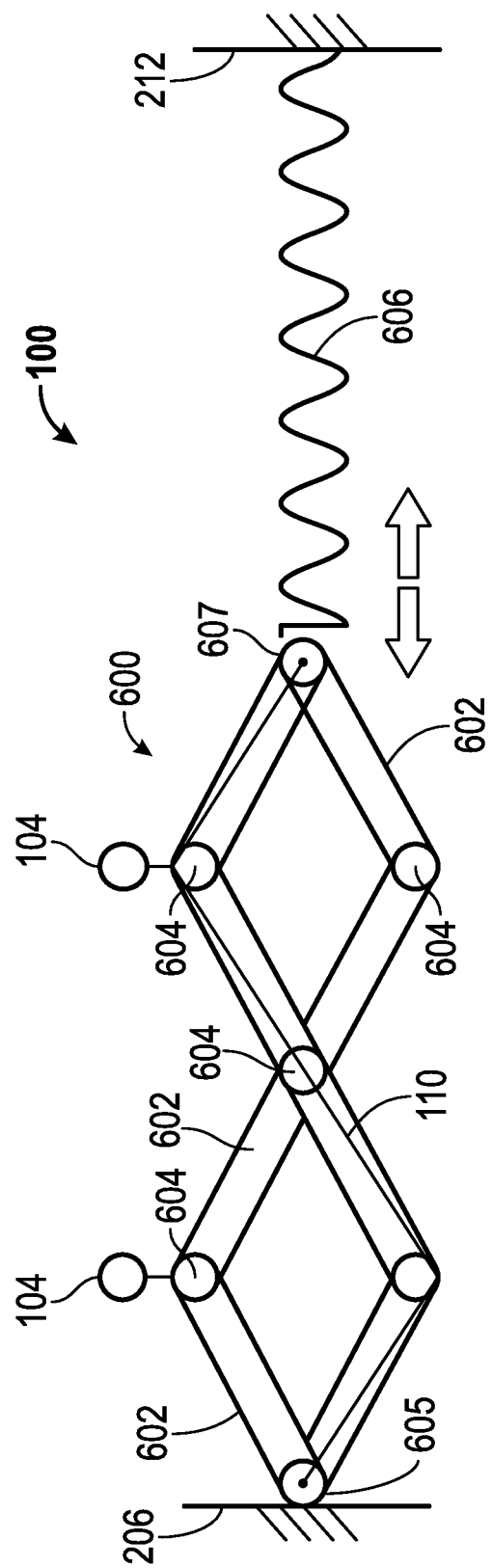
FIG. 6 is the sending apparatus in accordance with an additional exemplary embodiment.

In an exemplary embodiment as shown in FIG. 6, the apparatus 100 includes a pantograph mechanism 600. The pantograph mechanism 600 may alternatively be referred to as a pantograph, a scissors mechanism, or an accordion mechanism. As is shown in FIG. 6, the pantograph mechanism 600 includes a plurality of links 602 connected to one another with a plurality of pins 604. The pantograph mechanism 600 may be expanded or contracted as realized by those skilled in the art.

In the exemplary embodiment shown in FIG. 6, one end 605 of the pantograph mechanism 600 is operatively connected to the first anchor 206. At least one spring 606 operatively connects the other end 607 of the pantograph mechanism 600 to the second anchor 212. The spring 606 serves to pull the pantograph mechanism 600 into an expanded position.

The sensors 104 are operatively connected to the pantograph mechanism 600 at regular intervals such that the distances between each adjacent pair of sensors 104 change, but remain generally equal to one another, as the pantograph mechanism 600 is expanded and/or contracted. For instance, the sensors 104 may be operatively connected to a row of pins 604.

The SMA 110 is also operatively connected to the pantograph mechanism 600. More specifically, the SMA 110 of this exemplary embodiment if affixed at a plurality of points along the pantograph mechanism 600. In the exemplary embodiment shown in FIG. 6, the SMA 110 is fixed at the ends 605, 607 while being routed around at least one of the pins 604. Accordingly, when the SMA 110 is heated, e.g., by applying a current, the pantograph mechanism 600 contracts against the spring 606 towards a contracted position. The distance between the sensors 104 is changed as the pantograph mechanism 600 moves between expanded and contracted positions. Specifically, when the SMA 100 is fully contracted, a maximum distance between adjacent pairs of sensors 104 is achieved.

Of course, other embodiments of the mechanism 100 may be implemented other than the exemplary embodiments shown in FIGS. 2-6. As just one example, the apparatus 100 may include a bellows (not shown) that may expand and contract. The sensors 104 may be attached to the bellows with the SMA 110 attached to the bellows to actuate movement of the bellows.

The apparatus 100 described above may be utilized to control a beam pattern received and/or transmitted by the sensor array 101. However, apparatuses other than the ones specifically described above may alternatively be used to control the beam pattern. One exemplary method of controlling a beam pattern of the sensor array 101 includes receiving a desired frequency of operation. For example, the controller 112 may receive the desired frequency of operation from an external device (not shown). When the sensor array 101 is being utilized to receive a reflected RF signal, the desired frequency of operation may be the frequency at which RF signals are transmitted from a transmitter.

The method also includes deforming the SMA 110 operatively connected to the plurality of sensors 104 such that a distance between at least two of the sensors 104 corresponds to the desired frequency of operation. As stated above, deforming the SMA 110 may be accomplished by heating the SMA 110 by controlling the electrical current flowing therethrough.

The desired frequency of operation may vary between a first desired frequency and a second desired frequency. As such, deforming the SMA 110 includes deforming the SMA such that the distance between at least two of the sensors varies between a first distance corresponding to the first desired frequency and a second distance corresponding to the second desired frequency. The deforming of the SMA 110 may be continuous. That is, the SMA 110 may be deformed such that the distance between at least two of the sensors 104 varies continuously between the first distance and the second distance.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A sensing apparatus, comprising:
   a sensor array including a plurality of sensors with a distance defined between at least two of said sensors; and
   a shape memory alloy ("SMA") operatively connected to at least one of said plurality of sensors, said SMA controllably deformable to change the distance between said at least two of said sensors;
   wherein a desired frequency of operation for the sensors comprises a first desired frequency and a second desired frequency for a radio frequency ("RF") signal, and wherein said distance varies between a minimum distance corresponding to about one half of the first desired wavelength of the RF signal and a maximum distance corresponding to about one half of the second desired wavelength of the RF signal.

2. An apparatus as set forth in claim 1 wherein said sensor array is further defined as an ultra-wideband ("UWB") sensor array.

3. An apparatus as set forth in claim 1 wherein said plurality of sensors are positioned linearly.

4. An apparatus as set forth in claim 3 wherein said plurality of sensors includes at least three sensors and wherein a distance between two adjacent sensors is generally equal to a distance between another two adjacent sensors.

5. An apparatus as set forth in claim 4 wherein said SMA is controllably deformable to change said distances simultaneously.

6. An apparatus as set forth in claim 1 wherein said SMA is shaped as a spring.

7. An apparatus as set forth in claim 6 wherein said sensors are disposed on an elastic pad.

8. An apparatus as set forth in claim 7 further comprising a tie operatively connected between said elastic pad and said SMA and a pulley engaging with said tie.

9. An apparatus as set forth in claim 7 wherein at least one of said elastic pad or one of said sensors is operatively connected to a first anchor and said SMA is operatively connected to a second anchor.

10. An apparatus as set forth in claim 1 further comprising a pantograph mechanism having a plurality of links connected with a plurality of pins and wherein said sensors and said SMA are operatively connected to said pantograph mechanism.

11. An apparatus as set forth in claim 10 further comprising at least one spring operatively connected to said pantograph mechanism.

12. An apparatus as set forth in claim 11 wherein said pantograph mechanism is operatively connected to a first anchor and said spring is operatively connected to a second anchor.

13. A method of controlling a beam pattern of a sensor array, comprising:
   receiving a desired frequency of operation; and
   deforming an SMA operatively connected to a plurality of sensors such that a distance between at least two of the sensors corresponds to the desired frequency of operation;
   wherein the desired frequency of operation comprises a first desired frequency and a second desired frequency and wherein said deforming the SMA comprises deforming the SMA such that the distance between at least two of the sensors varies between a first distance corresponding to the first desired frequency and a second distance corresponding to the second desired frequency.

14. A method as set forth in claim 13 wherein said deforming the SMA is further defined as heating the SMA.

15. A method as set forth in claim 14 wherein said heating the SMA is further defined as controlling an electrical current flowing through the SMA.

16. A method as set forth in claim 13, wherein said deforming the SMA comprises deforming the SMA such that the distance between at least two of the sensors varies continuously between the first distance and the second distance.

* * * * *